(12) United States Patent
Kawai

(10) Patent No.: US 8,113,326 B2
(45) Date of Patent: Feb. 14, 2012

(54) CLUTCH UNIT

(75) Inventor: Masahiro Kawai, Iwata (JP)

(73) Assignee: NTN Corporation, Osaka (JP)

( * ) Notice: Subject to any disclaimer, the term of this patent is extended or adjusted under 35 U.S.C. 154(b) by 727 days.

(21) Appl. No.: 12/225,372

(22) PCT Filed: Apr. 3, 2007

(86) PCT No.: PCT/JP2007/057455
§ 371 (c)(1),
(2), (4) Date: Sep. 19, 2008

(87) PCT Pub. No.: WO2007/122986
PCT Pub. Date: Nov. 1, 2007

(65) Prior Publication Data
US 2010/0224461 A1 Sep. 9, 2010

(30) Foreign Application Priority Data
Apr. 19, 2006 (JP) .................................. 2006-115218

(51) Int. Cl.
*F16D 15/00* (2006.01)
*F16D 41/08* (2006.01)
*F16D 47/04* (2006.01)

(52) U.S. Cl. .......................... 192/15; 192/19; 192/223.2

(58) Field of Classification Search ..................... 192/15, 192/16, 19, 223.2
See application file for complete search history.

(56) References Cited

U.S. PATENT DOCUMENTS

| 3,700,082 | A | 10/1972 | Schwab | |
|---|---|---|---|---|
| 2005/0006193 | A1* | 1/2005 | Kim | ............................. 192/15 |

FOREIGN PATENT DOCUMENTS

| DE | 198 56 634 | 1/2001 |
|---|---|---|
| DE | 199 61 639 | 10/2001 |
| JP | 2002-178807 | 6/2002 |
| JP | 2003-97605 | 4/2003 |
| JP | 2003-166555 | 6/2003 |

(Continued)

OTHER PUBLICATIONS

International Search Report mailed May 1, 2007 for International Application No. PCT/JP2007/057455.

(Continued)

*Primary Examiner* — Rodney Bonck
(74) *Attorney, Agent, or Firm* — Wenderoth, Lind & Ponack, L.L.P.

(57) ABSTRACT

A clutch unit has a lever side outer ring or a brake side outer ring with increased strength and in which an elastic deformation amount is reduced to improve breaking torque. The clutch unit has a lever side clutch section provided on an input side, for controlling transmission and interrupting rotational torque to an output side through lever operation, and also has a brake side clutch section provided on the output side, for transmitting input torque from the lever side clutch section to the output side and interrupting reverse input torque from the output side. A lever side outer ring of the brake side clutch section includes two members, a thick plate-like member formed by punching and a cover formed by press working. The plate-like member and the cover are integrally fixed together by swaging by means of a lever-side side plate. A lever side outer ring of the lever side clutch section is formed of a thick plate-like member formed by punching.

9 Claims, 17 Drawing Sheets

FOREIGN PATENT DOCUMENTS

JP 2004-338426 12/2004

OTHER PUBLICATIONS

Supplementary European Search Report dated Nov. 15, 2010 in corresponding European Patent Application No. 07740891.2.

International Preliminary Report on Patentability mailed Nov. 27, 2008 for International Application No. PCT/JP2007/057455.

Written Opinion of the International Searching Authority mailed Nov. 27, 2008 for International Application No. PCT/JP2007/057455.

* cited by examiner

CLUTCH UNIT

TECHNICAL FIELD

The present invention relates to a clutch unit having a lever side clutch section transmitting rotational torque from an input side to an output side thereof and a brake side clutch section transmitting rotational torque from the input side to the output side and shutting off reverse input torque from the output side.

BACKGROUND ART

Generally speaking, in a clutch unit using engagement members such as cylindrical rollers or balls, a clutch section is arranged between the input side member and the output side member, and, in the clutch section, the engagement members such as cylindrical rollers or balls are engaged/disengaged with/from a wedge gap formed between the input side member and the output side member, thereby controlling transmission/interruption of the input torque.

A clutch unit of this type is incorporated into a seat lifter section for a vehicle which vertically moves a seat through lever operation. This clutch unit is provided with a lever side clutch section transmitting rotational torque from the input side to the output side and a brake side clutch section transmitting rotational torque from the input side to the output side and shutting off reverse input torque from the output side (see, for example, Patent Documents 1 and 2).

FIG. 14 is a sectional view showing the general construction of the conventional clutch unit disclosed in Patent Documents 1 and 2, and FIG. 15 is a right-hand side view of the clutch unit shown in FIG. 14. FIG. 16 is a sectional view taken along the line C-C of FIG. 14, and FIG. 17 is a sectional view taken along the line D-D of FIG. 14.

As shown in the drawings, a lever side clutch section 111 mainly includes a lever side outer ring 114 serving as an input side member to which torque is input through lever operation, an inner ring 115 serving as a coupling member transmitting the torque from the lever side outer ring 114 to a brake side clutch section 112, a plurality of cylindrical rollers 116 serving as engagement members controlling transmission/interruption of the input torque from the lever side outer ring 114 through engagement/disengagement between the lever side outer ring 114 and the inner ring 115, a retainer 117 retaining the cylindrical rollers 116 at predetermined circumferential intervals, a brake side outer ring 122 serving as a stationary side member constrained in its rotation, an inner centering spring 118 serving as a first elastic member which is provided between the retainer 117 and the brake side outer ring 122 and accumulates elastic force with input torque from the lever side outer ring 114, restoring the retainer to the neutral state with the accumulated elastic force through releasing the input torque, and an outer centering spring 119 serving as a second elastic member which is provided between the lever side outer ring 114 and the brake side outer ring 122 and accumulates elastic force with input torque from the lever side outer ring 114, restoring the lever side outer ring 114 to the neutral state with the accumulated elastic force through releasing the input torque.

In the drawings, numeral 113 indicates a lever-side side plate fixed to the lever side outer ring 114 by swaging and constituting the input side member together with the lever side outer ring 114, and numeral 130 indicates a washer mounted to an output shaft 124 through the intermediation of a wave washer 131.

On the other hand, the brake side clutch section 112 mainly includes the brake side outer ring 122 serving as a stationary side member constrained in its rotation, the inner ring 115 serving as a coupling member to which torque from the lever side clutch section 111 is input, and a plurality of pairs of cylindrical rollers 125 serving as engagement members arranged in a gap between the brake side outer ring 122 and the output shaft 124, for controlling transmission of input torque from the inner ring 115 and interrupting reverse input torque from the output shaft 124 through engagement/disengagement between the brake side outer ring 122 and the output shaft 124.

A flange portion of the inner ring 115 functions as a retainer retaining the cylindrical rollers 125 at predetermined circumferential intervals. In the drawings, numeral 123 indicates a brake-side side plate fixed to the brake side outer ring 122 by swaging and constituting the stationary side member together with the brake side outer ring 122, numeral 126 indicates a plate spring of, for example, an N-shaped sectional configuration arranged between the cylindrical rollers 125 of each pair, and numeral 129 indicates a friction ring serving as a brake member mounted to the brake-side side plate 123.

Patent Document 1: JP 2003-166555 A
Patent Document 2: JP 2003-97605 A

SUMMARY OF THE INVENTION

Problem to be Solved by the Invention

The lever side outer ring 114, which is one of the components forming the lever side clutch section 111 of the conventional clutch unit disclosed in Patent Documents 1 and 2, is formed into a cup-shaped configuration by press working of a single plate-like material. The brake-side outer ring 122, which is one of the components forming the brake side clutch section 112, is also formed into a cup-shaped configuration by press working of a single plate-like material.

As described above, the lever side outer ring 114 and the brake side outer ring 122 are formed into the cup-shaped configuration by press working, and hence there is a limitation to the thickness of a plate-like material allowing shaping. That is, it is difficult to produce the lever side outer ring 114 and the brake side outer ring 122 by press working of a plate-like material having a thickness that is larger than a fixed thickness.

Thus, it cannot be helped but to reduce the thickness of the lever side outer ring 114 and the brake side outer ring 122, with the result that the strength of the lever side outer ring 114 and the brake side outer ring 122 is reduced. Further, the elastic deformation amount is rather large, which makes it possible to achieve an improvement in terms of the breaking torque of the clutch. The term breaking torque is generally used as an index of the strength of a component, and means the maximum torque applied at the point in time when the component suffers breakage.

The present invention has been made in view of the above-mentioned problem. It is an object of the present invention to provide a clutch unit in which the strength of the lever side outer ring or the brake side outer ring is increased and in which the elastic deformation amount is reduced to help to easily achieve an improvement in terms of breaking torque.

Means for Solving the Problem

A clutch unit according to the present invention has a structure including: a lever side clutch section provided on an input side, for controlling transmission/interruption of rotational torque to an output side through lever operation; and a brake side clutch section provided on the output side, for transmitting input torque from the lever side clutch section to the output side and interrupting reverse input torque from the output side.

The brake side clutch section in the clutch unit includes a coupling member to which the torque from the lever side clutch section is input, an output side member from which torque is output, a stationary side member constrained in its rotation, and a plurality of pairs of engagement members arranged in a gap between the stationary side member and the output side member, for controlling transmission of the input torque from the coupling member and interrupting of the reverse input torque from the output side member through engagement/disengagement between the two members.

Further, the lever side clutch section in the clutch unit includes an input side member to which torque is input through lever operation; a coupling member transmitting the torque from the input side member to the brake side clutch section; a plurality of engagement members for controlling transmission/interruption of the input torque from the input side member through engagement/disengagement between the input side member and the coupling member; a retainer retaining the engagement members at predetermined intervals in a circumferential direction; a stationary side member constrained in its rotation; a first elastic member provided between the retainer and the stationary side member, for accumulating elastic force with the input torque from the input side member and restoring the retainer to a neutral state by an accumulated elastic force through releasing of the input torque; a second elastic member provided between the input side member and the stationary side member, for accumulating the elastic force with the input torque from the input side member and restoring the input side member to the neutral state by the accumulated elastic force through releasing of the input torque; and a detachment prevention member press-fitted into the coupling member.

A first feature of the present invention lies in that the stationary side member of the brake side clutch section forms an outer ring with two members of a thick plate-like member formed by punching and a cover formed by press working, with the plate-like member and the cover being integrally fixed together by swaging by means of a side plate.

While in the conventional clutch unit the stationary side member of the brake side clutch section, that is, the brake side outer ring, is formed by a single cup-shaped member formed by press working, in the clutch unit of the present invention, the brake side outer ring is formed by two members of a plate-like member formed by punching and a cover formed by press working. The plate-like member forming the main portion of the brake side outer ring is formed by punching, and hence the thickness of the plate-like member can be increased, making it possible to increase the strength of the brake side outer ring and to reduce the elastic deformation amount, thereby easily achieving an improvement in terms of breaking torque.

The function of the conventional brake side outer ring is exerted by the above-mentioned plate-like member and the cover, and hence the brake side outer ring is obtained by integrally fixing the plate-like member and the cover to each other by swaging by means of the side plate.

A second feature of the present invention lies in the fact that the input side member of the lever side clutch section is formed by a thick plate-like member formed by punching.

While in the conventional clutch unit the input side member of the lever side clutch section is formed by the cup-shaped lever side outer ring formed by press working, in the clutch unit of the present invention, the lever side outer ring is formed by a plate-like member formed by punching. In this case, the plate-like member forming the lever side outer ring is formed by punching, and hence the thickness of the plate-like member can be increased, making it possible to increase the strength of the lever side outer ring and to reduce the elastic deformation amount, thereby easily achieving an improvement in terms of breaking torque.

Effects of the Invention

According to the present invention, the stationary side member of the brake side clutch section forms an outer ring with two members of a thick plate-like member formed by punching and a cover formed by press working, and the plate-like member and the cover are integrally fixed to each other by swaging by means of a side plate. Accordingly, it is possible to increase the strength of the brake side outer ring forming the main portion of the stationary side member of the brake side clutch section and to reduce the elastic deformation amount, thereby easily achieving an improvement in terms of breaking torque.

Further, the input side member of the lever side clutch section is formed by a thick plate-like member formed by punching. Accordingly, it is possible to increase the strength of the lever side outer ring, which is the input side member of the lever side clutch section, and to reduce the elastic deformation amount, thereby easily achieving an improvement in terms of breaking torque.

As described above, the strength of the stationary side member of the brake side clutch section or the input side member of the lever side clutch section is increased, and the elastic deformation amount is reduced to thereby easily achieve an improvement in terms of breaking torque. Accordingly, it is possible to increase the strength of the clutch unit, and to reduce the axial dimension of the above-mentioned stationary side member or the input side member, whereby it is possible to achieve a reduction in size and cost of the clutch unit.

DETAILED DESCRIPTION OF THE INVENTION

Figure 1:
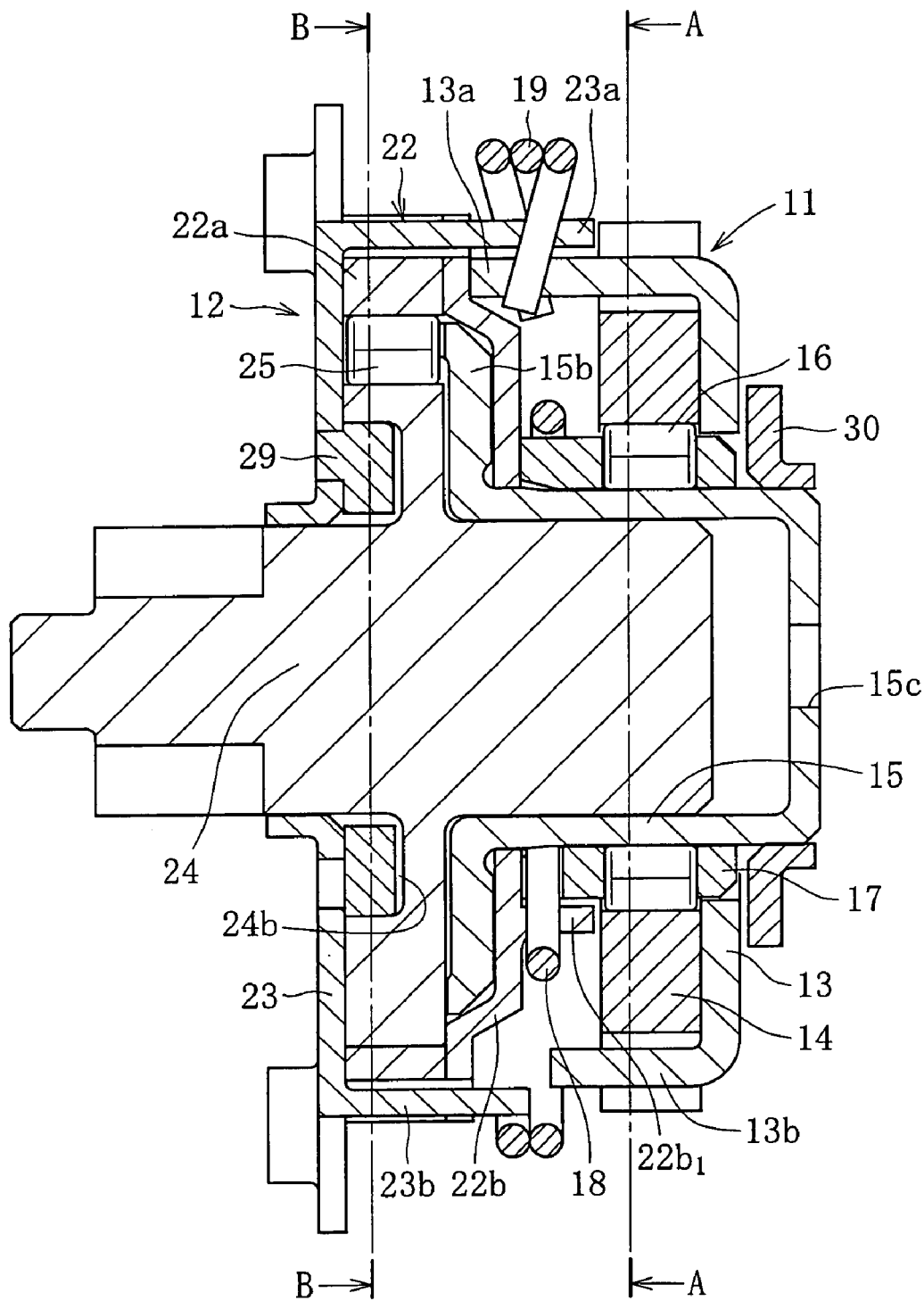
FIG. 1 is a sectional view showing the general construction of a clutch unit according to an embodiment of the present invention.
Figure 2:
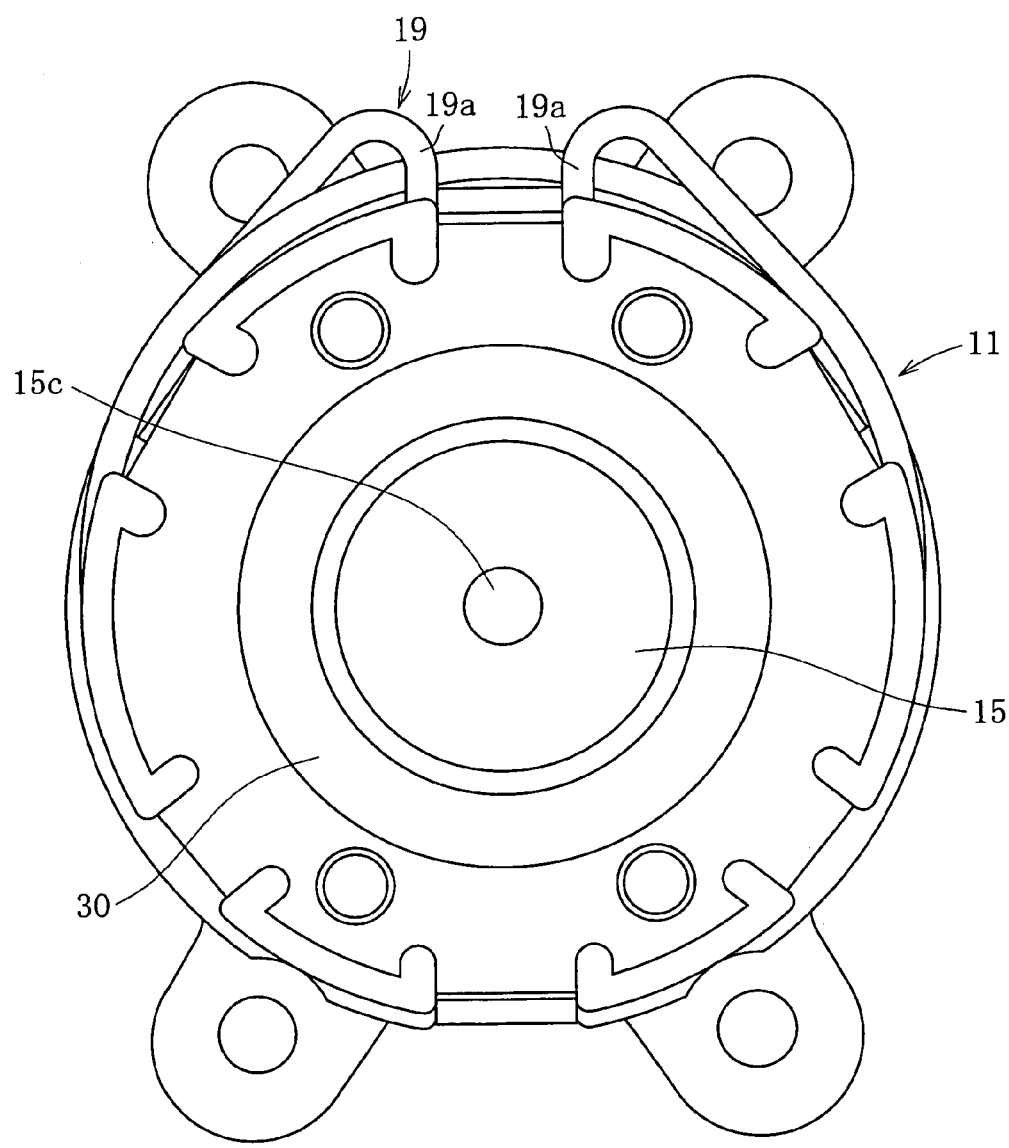
FIG. 2 is a right-hand side view of FIG. 1.
Figure 3:
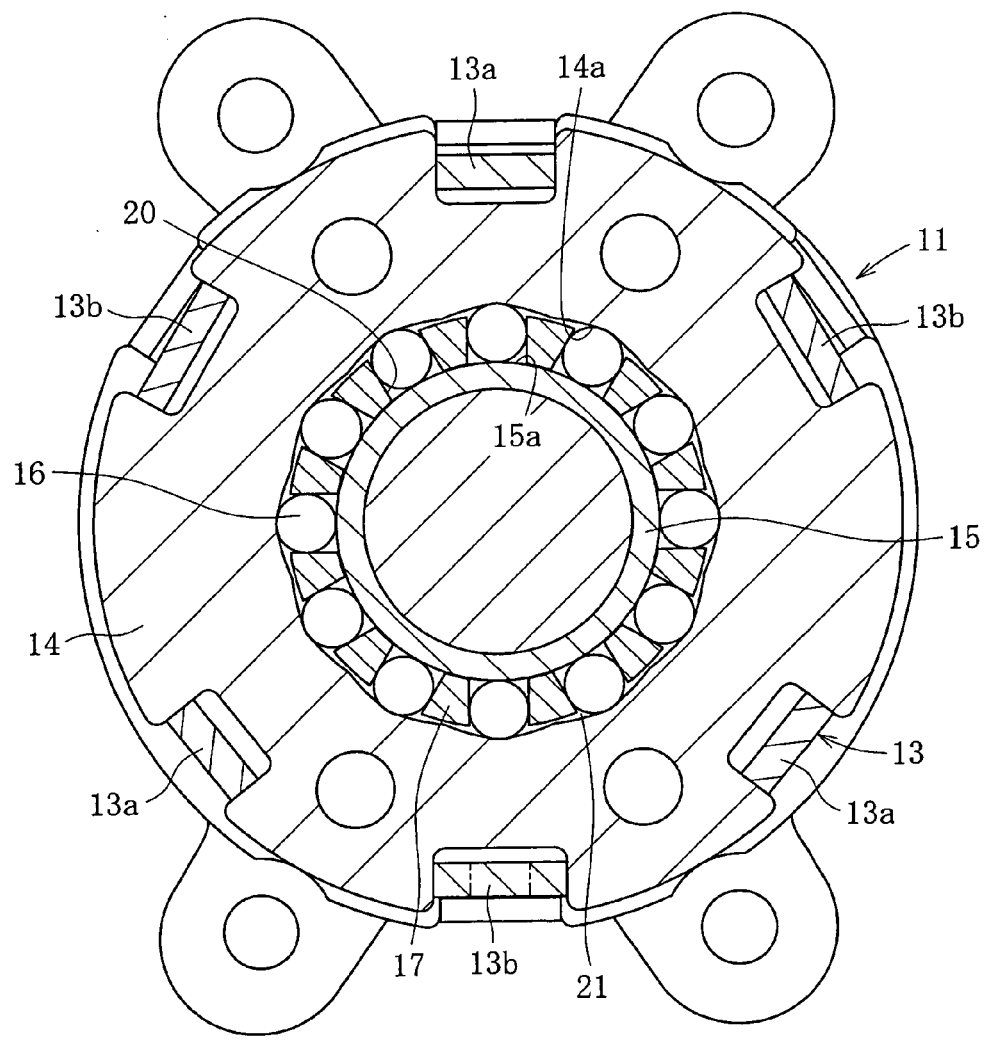
FIG. 3 is a sectional view taken along the line A-A of FIG. 1.
Figure 4:
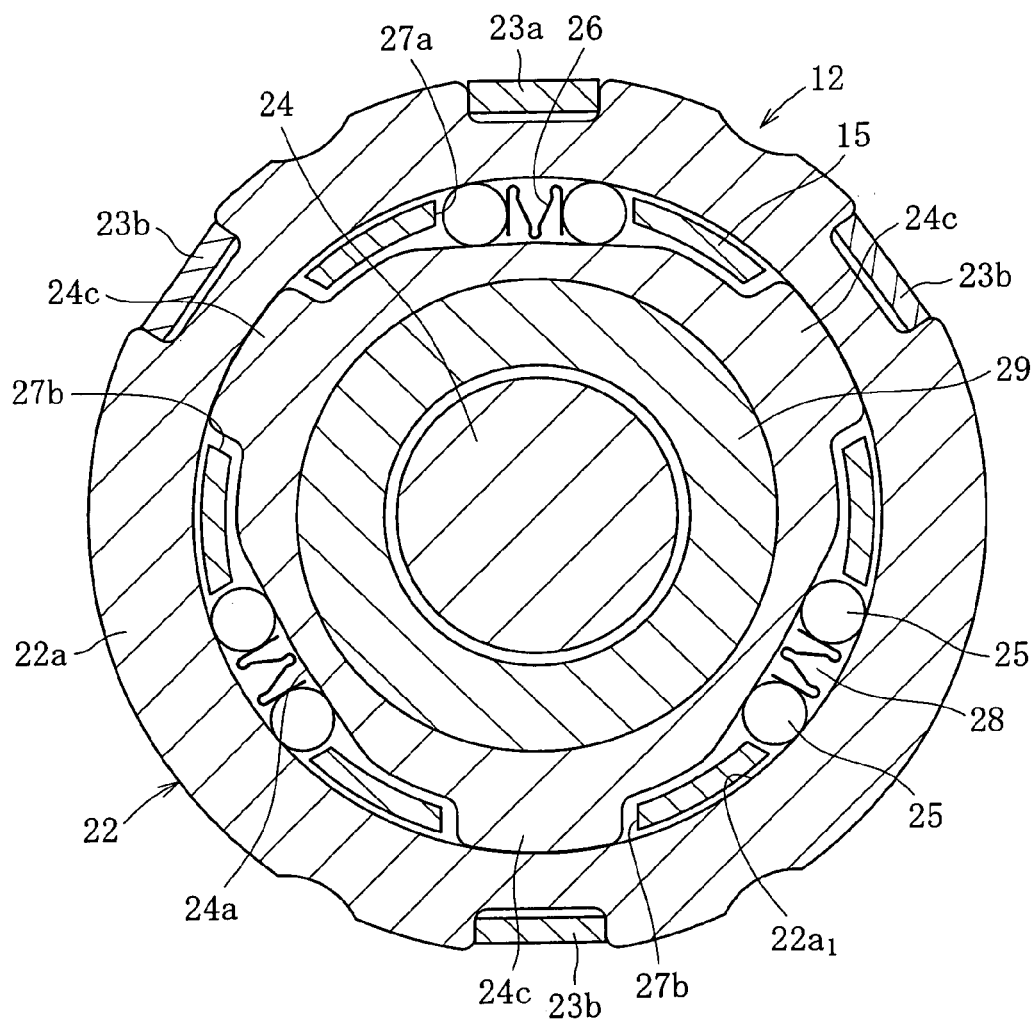
FIG. 4 is a sectional view taken along the line B-B of FIG. 1.

FIG. 1 is a sectional view showing the general construction of a clutch unit according to an embodiment of the present invention, and FIG. 2 is a right-hand side view of the clutch unit shown in FIG. 1. FIG. 3 is a sectional view taken along the line A-A of FIG. 1, and FIG. 4 is a sectional view taken along the line B-B of FIG. 1.

This clutch unit includes a lever side clutch section 11 provided on the input side and a brake side clutch section 12 with a reverse input shutting off function provided on the output side.

The lever side clutch section 11 has a lever side outer ring 14 serving as an input side member coupled, for example, to a lever (not shown), an inner ring 15 serving as a coupling member, a plurality of cylindrical rollers 16 serving as engagement members, a retainer 17 retaining the cylindrical rollers 16, an inner centering spring 18 which is a first elastic member for restoring the retainer 17 to a neutral state, and an outer centering spring 19 which is a second elastic member for restoring the lever side outer ring 14 to a neutral state (see FIG. 1). A washer 30 is press-fitted onto an end portion of a bottomed cylindrical portion 15a of the inner ring 15, thereby preventing detachment of the components.

The lever side outer ring 14 is formed of a thick plate-like member formed by punching. In the inner periphery of the lever side outer ring 14, a plurality of cam surfaces 14a are formed at equal circumferential intervals (see FIG. 3). The inner ring 15 has on its outer side an outer peripheral surface 15a forming a wedge gap 21 between itself and the cam surfaces 14a of the lever side outer ring 14. The retainer 17 has a plurality of pockets 20 accommodating the cylindrical rollers 16.

Figure 5:
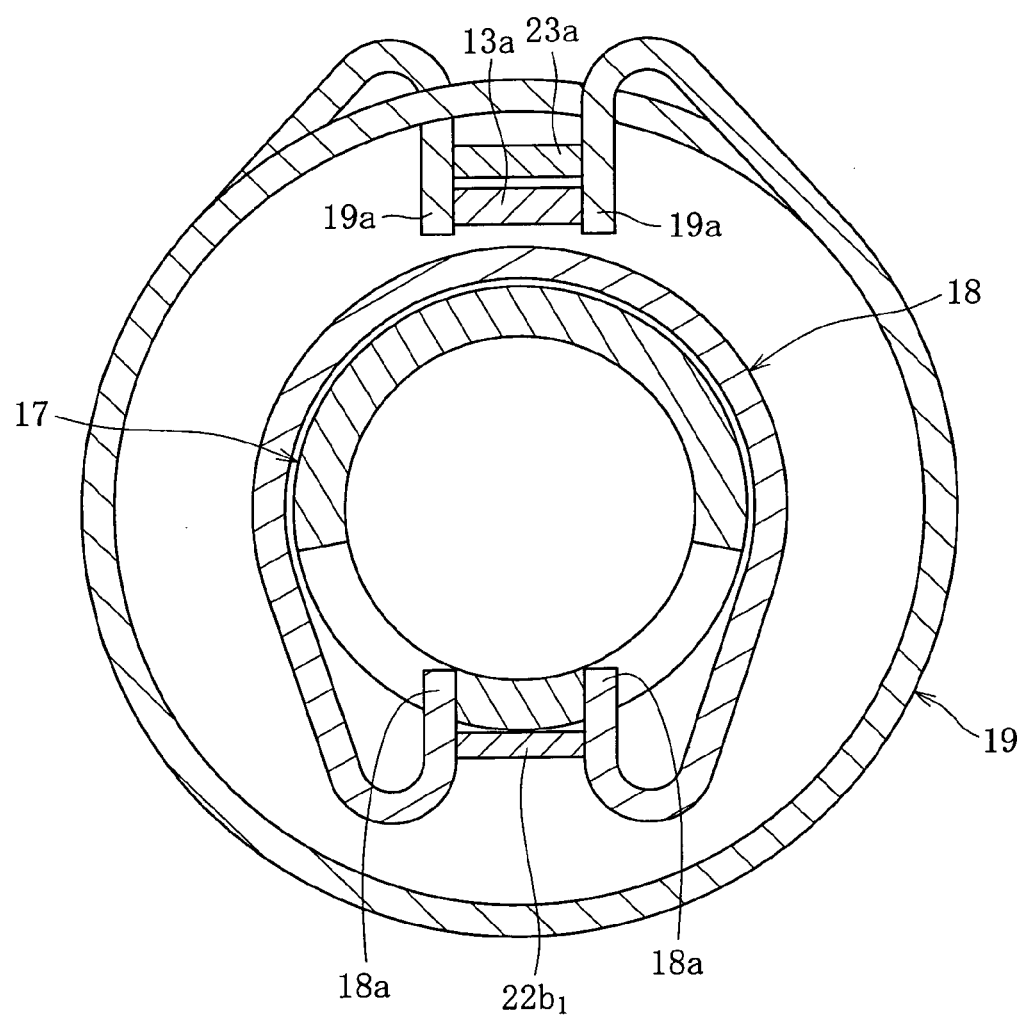
FIG. 5 is a sectional view showing the arrangement relationship between two centering springs.

As shown in FIG. 5, the inner centering spring 18 is arranged on the inner side of the outer centering spring 19 (see FIG. 1). The inner centering spring 18, situated on the inner side, has a pair of lock portions 18a formed by being bent radially inwards, and the outer centering spring 19, situated on the outer side, has also a pair of lock portions 19a formed by being bent radially inwards.

The inner centering spring 18 is arranged between the retainer 17 and a brake side outer ring 22 which is a stationary side member of the brake side clutch portion 12. Both lock portions 18a are locked to the retainer 17, and are locked to a claw portion $22b_1$ (see FIG. 5) provided on the brake side outer ring 22.

In the inner centering spring 18, when input torque from the lever side outer ring 14 is exerted, one lock portion 18a is engaged with a part of the retainer 17, and the other lock portion 18a is engaged with the claw portion $22b_1$ of the brake side outer ring 22, and hence, as the lever side outer ring 14 rotates, the inner centering spring 18 is pushed open to accumulate elastic force. Further, when the input torque from the lever side outer ring 14 is released, the retainer 17 is restored to the neutral state by the elastic restoring force thereof.

The outer centering spring 19 is arranged between a lever-side side plate 13 which is fixed to the lever side outer ring 14 by swaging and a brake-side side plate 23 which is fixed to the brake side outer ring 22 by swaging, with both lock portions 19a being locked to a claw portion 13a provided on the lever-side side plate 13 and locked to a claw portion 23a provided on the brake-side side plate 23. The lock portions 19a are arranged circumferentially out of phase with respect to the lock portions 18a of the inner centering spring 18.

The lock portions 19a of the outer centering spring 19 are also bent axially inwards (see FIG. 5), whereby bending is effected in the axial direction so as to reduce the axial distance between the portions of the lock portions 19a of the outer centering spring 19 held in contact with the claw portion 13a of the lever-side side plate 13 and the claw portion 23a of the brake-side side plate 23.

In the outer centering spring 19, when the input torque from the lever side outer ring 14 is exerted, and the lever-side side plate 13 rotates with the rotation of the lever side outer ring 14, one lock portion 19a is engaged with the claw portion 13a of the lever-side side plate 13, and the other lock portion 19a is engaged with the claw portion 23a of the brake-side side plate 23, and hence, as the lever side outer ring 14 rotates, the outer centering spring 19 is pushed open, and elastic force is accumulated. Further, when the input torque from the lever side outer ring 14 is released, the lever side outer ring 14 is restored to the neutral state by the elastic restoring force thereof.

As shown in FIG. 4, the so-called lock type brake side clutch section 12 with a reverse input shutting off function mainly includes the inner ring 15 serving as a coupling member to which the torque from the lever side clutch section 11 is input, an output shaft 24 serving as an output side member, the brake side outer ring 22 and the brake-side side plate 23 serving as the stationary side member constrained in their rotation, a plurality of pairs of cylindrical rollers 25 serving as engagement members arranged in the gap between the brake side outer ring 22 and the output shaft 24, for controlling transmission of the input torque from the inner ring 15 and interrupting reverse input torque from the output shaft 24 through engagement/disengagement between both members, and plate springs 26 of, for example, an M-shaped sectional configuration, each provided between the cylindrical rollers 25 of each pair and serving as elastic members imparting repulsive force to the cylindrical rollers 25.

A plurality of (e.g., three, in the case of the embodiment shown in FIG. 4) cam surfaces 24a are formed on the outer side of the output shaft 24 at equal circumferential intervals, with the cylindrical rollers 25 and the plate springs 26 being arranged in a wedge gap 28 provided between the cam surfaces 24a and the inner peripheral surface $22a_1$ of the brake side outer ring 22. A flange portion 15b of the inner ring 15 (see FIG. 1) also serves as a retainer having pockets 27a formed at equal circumferential intervals and accommodating the cylindrical rollers 25 and the plate spring 26.

A friction ring 29 serving as a brake member is mounted to the brake-side side plate 23, and the friction ring 29 is press-fitted with interference into the outer peripheral wall of an annular recess 24b of the output shaft 24. Further, as shown in FIG. 4, the output shaft 24 is provided with a plurality of (three, in the figure) protrusions 24c protruding outwardly. The protrusions 24c are inserted and arranged in the pockets 27b accommodating no cylindrical rollers 25 or plate springs 26 while leaving circumferential clearances.

The brake side outer ring 22 is formed by two members of a thick plate-like member 22a formed by punching and a cover 22b formed by press working, with the plate-like member 22a and the cover 22b being integrally fixed to each other by swaging by means of the brake-side side plate 23. The wedge gap 28 is formed between the inner peripheral surface $22a_1$ of the brake side outer ring 22 and the cam surfaces 24a of the output shaft 24. The cover 22b of the brake side outer ring 22 has the lock portion $22b_1$ (see FIG. 5) to be engaged with the inner centering spring 18 of the lever side clutch section 11.

In the following, the components of the lever side clutch section 11 and the brake side clutch section 12 of the clutch unit are described in detail, comparing those of the present invention with those of a conventional product.

Figure 6:
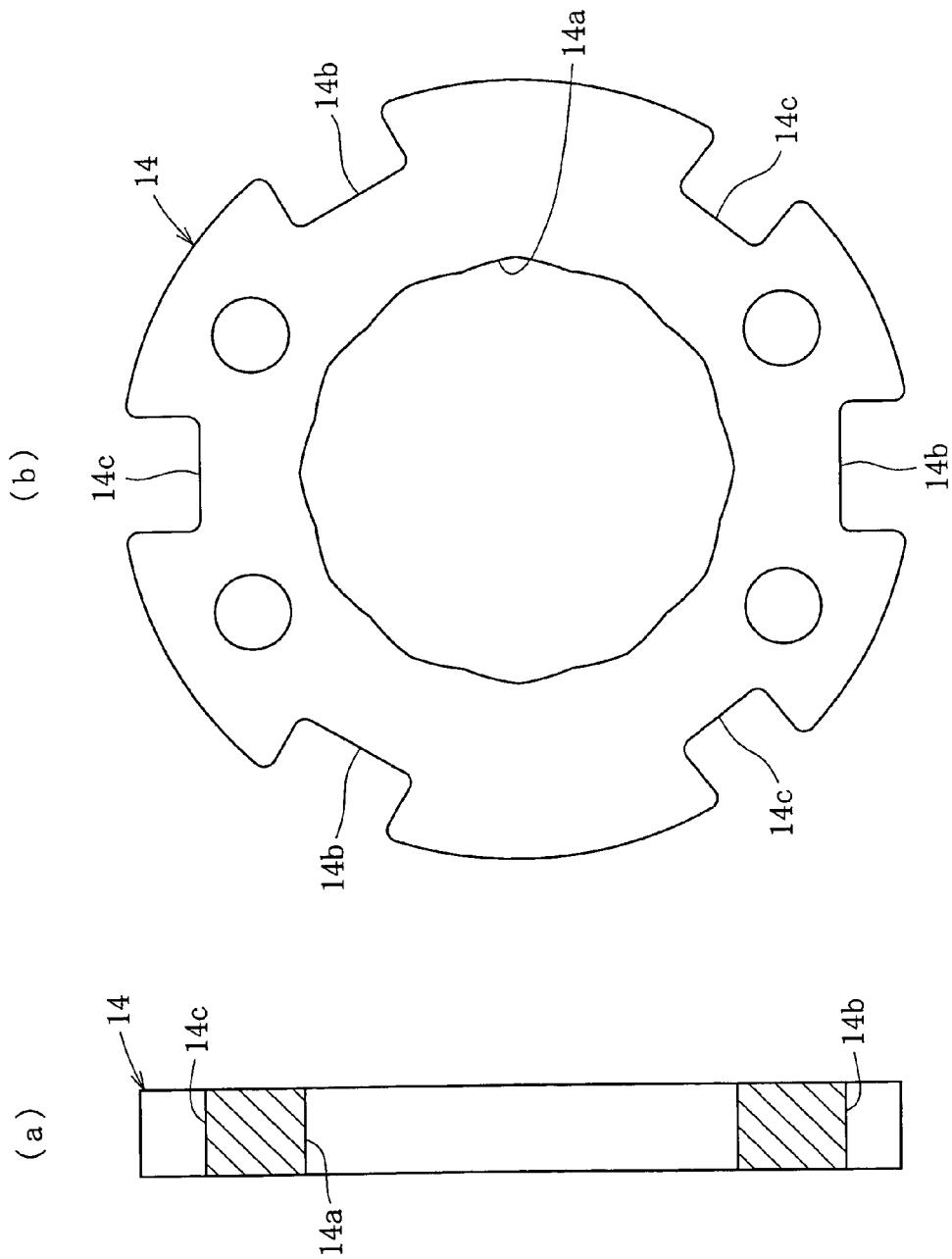
FIG. 6(a) is a sectional view of a lever side outer ring according to the present invention.
FIG. 6(b) is a side view of FIG. 6(a).
Figure 7:
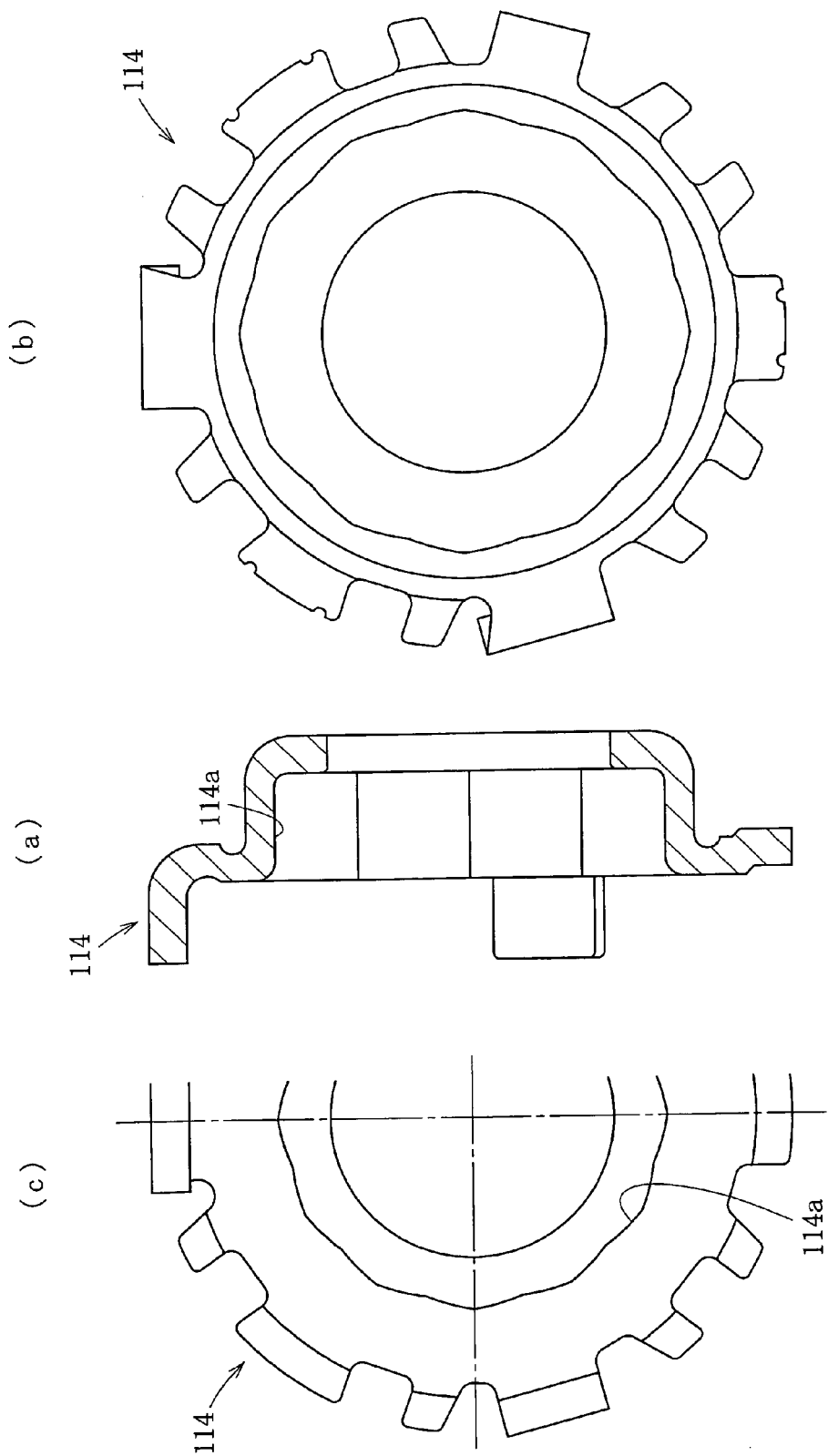
FIG. 7(a) is a sectional view of a conventional lever side outer ring.
FIG. 7(b) is a right-hand side view of FIG. 7(a)
FIG. 7(c) is a left-hand side view of FIG. 7(a).

FIGS. 6(a) and 6(b) show the lever side outer ring 14 of the present invention, and FIGS. 7(a) through 7(c) show the lever side outer ring 114 of the conventional product. The lever side outer ring 14 of the present invention includes a thick plate-like member formed by punching of a single material. In contrast, the lever side outer ring 114 of the conventional product is formed into a cup-shaped configuration by press working out of a single plate-like member.

Figure 8:
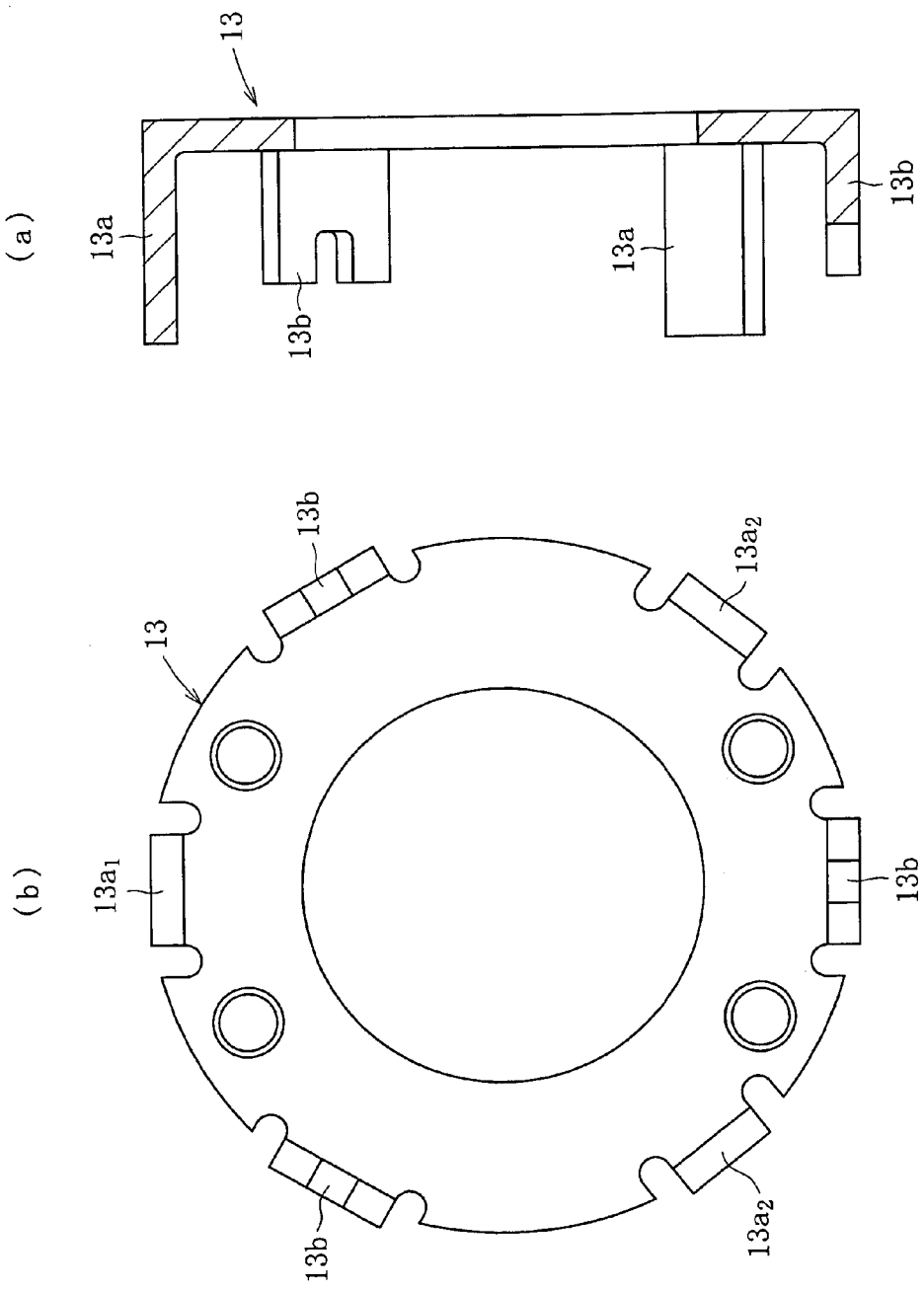
FIG. 8(a) is a sectional view of a lever-side side plate according to the present invention.
FIG. 8(b) is a side view of FIG. 8(a).

In the outer periphery of the lever side outer ring 14 of the present invention, there are formed a plurality of cutouts 14b into which claw portions 13b of the lever-side side plate 13 (see FIGS. 8(a) and 8(b)) are to be inserted. By swaging the claw portions 13b of the lever-side side plate 13 inserted into the cutouts 14b, the lever-side side plate 13 and the lever side outer ring 14 are connected to each other. One claw portion $13a_1$ of the lever-side side plate 13 arranged between the lock portions 19a of the outer centering spring 19 is inserted into one of cutouts 14c provided in the outer periphery of the lever side outer ring 14. Further, as the lever side outer ring 14 rotates, two claw portions $13a_2$ rotate therewith, and come into circumferential contact with stopper claws $22b_4$, which serve as rotation stoppers of the cover 22b of the brake side outer ring 22, thereby regulating the lever operation angle.

As described above, while the conventional product uses the cup-shaped lever side outer ring 114 formed by press working, the lever side outer ring 14 of the present invention is formed by punching of a plate-like member, and hence the plate-like member can be thicker (approximately three times as thick as that of the conventional product), making it possible to achieve an improvement in terms of the strength of the lever side outer ring 14 and to reduce the elastic deformation amount to thereby easily achieve an improvement in terms of breaking torque.

Figure 9:
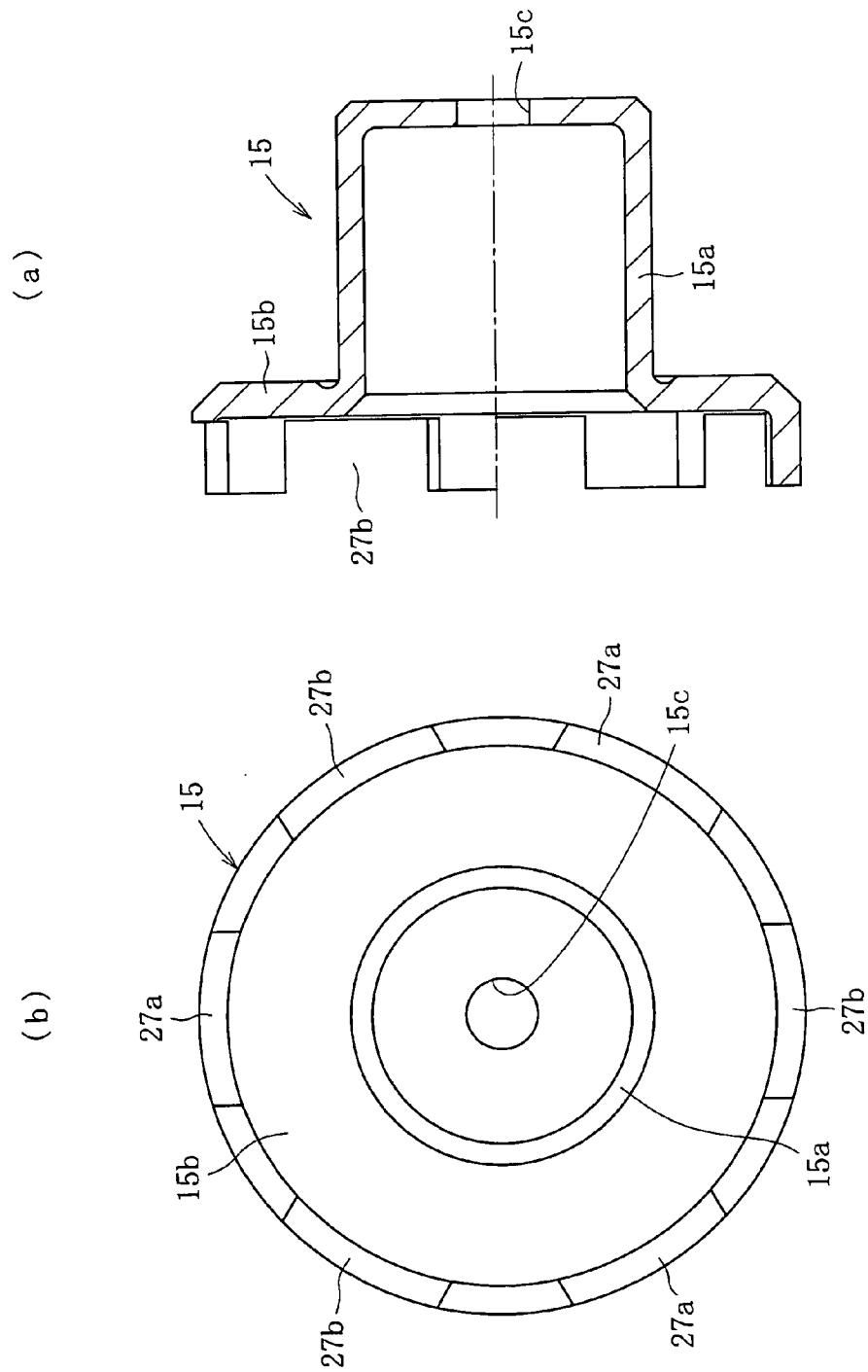
FIG. 9(a) is a sectional view of an inner ring according to the present invention.
FIG. 9(b) is a side view of FIG. 9(a).
Figure 10:
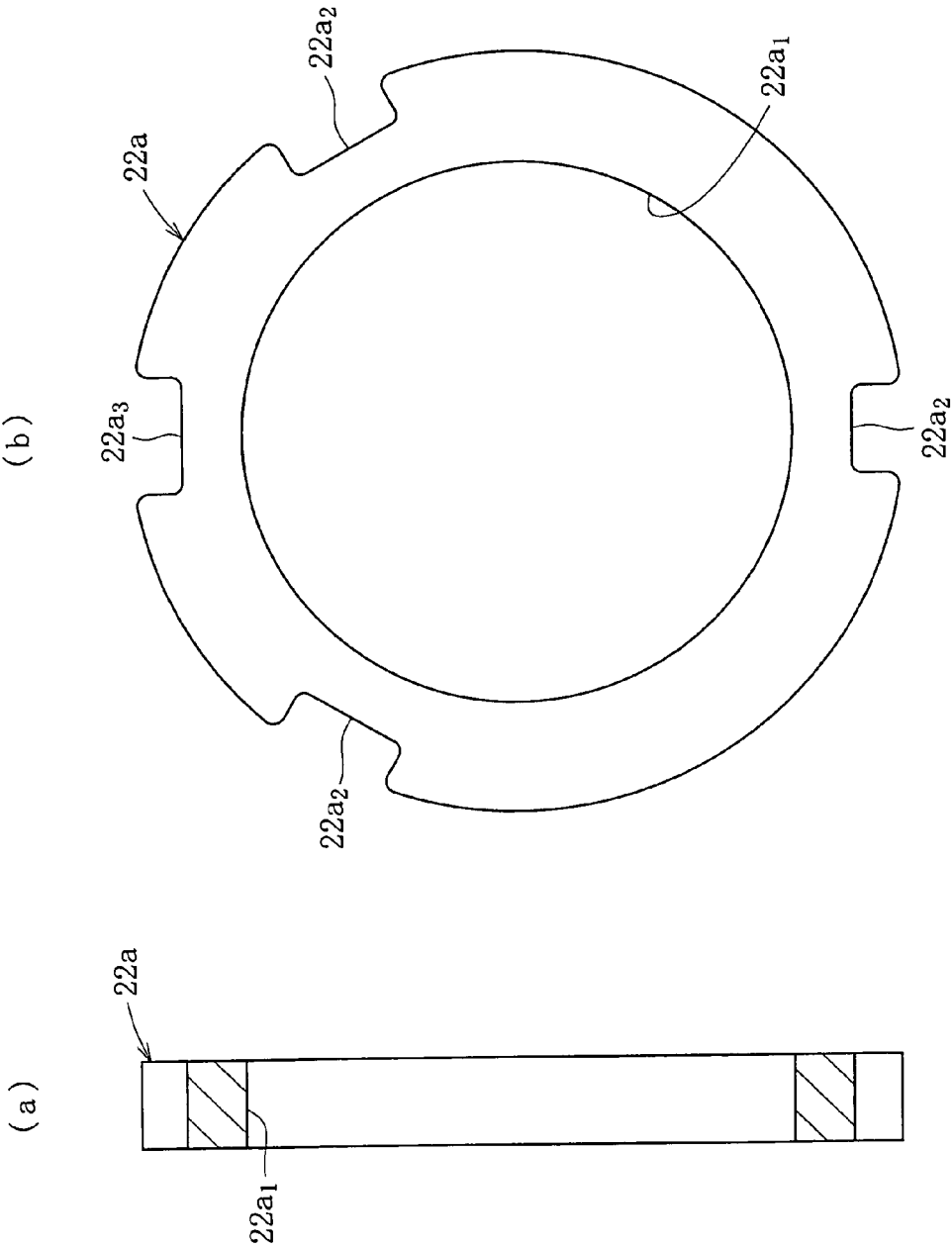
FIG. 10(a) is a sectional view of a brake side outer ring according to the present invention.
FIG. 10(b) is a side view of FIG. 10(a).

As shown in FIGS. 9(a) and 9(b), regarding the inner ring 15 of the present invention, a flange portion 15b is formed at the opening end of a bottomed cylindrical portion 15a, and, in the outer peripheral edge portion of the flange portion 15b and in the circumferential direction thereof, there are alternately formed a plurality of (three) pockets 27a accommodating the cylindrical rollers 25 and the plate spring 26 and a plurality of (three) pockets 27b accommodating the protrusions 24c of the output shaft 24. An air hole 15c is formed in the bottom surface of the bottomed cylindrical portion 15a.

By forming the inner ring 15 as a bottomed cylindrical portion, an improvement in terms of strength is achieved. Further, the air hole 15c provided in the bottomed cylindrical portion 15a exerts an air releasing function when mounting the output shaft 24.

Figure 11:
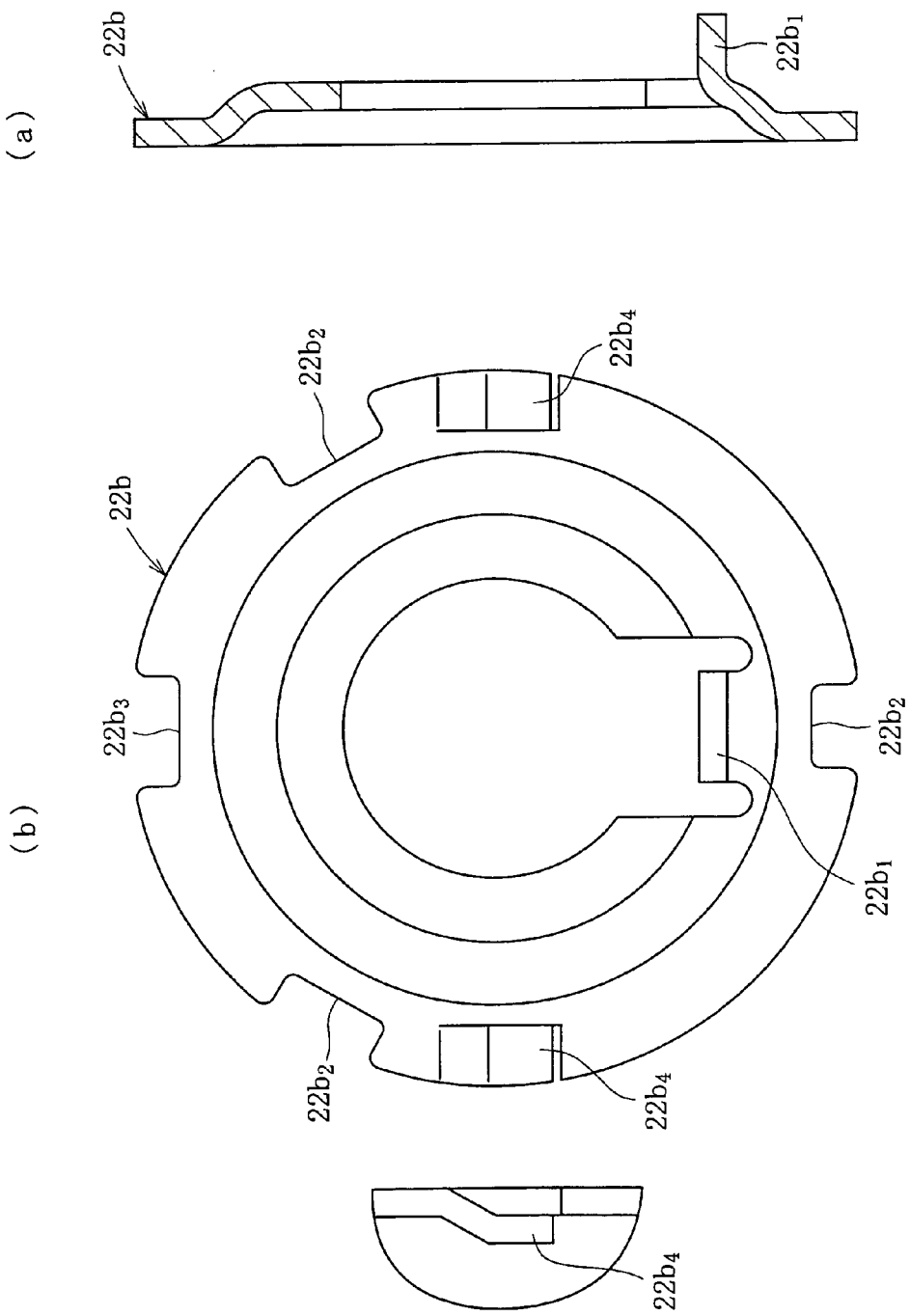
FIG. 11(a) is a sectional view of a cover according to the present invention.
FIG. 11(b) is a side view of FIG. 11(a).
Figure 12:
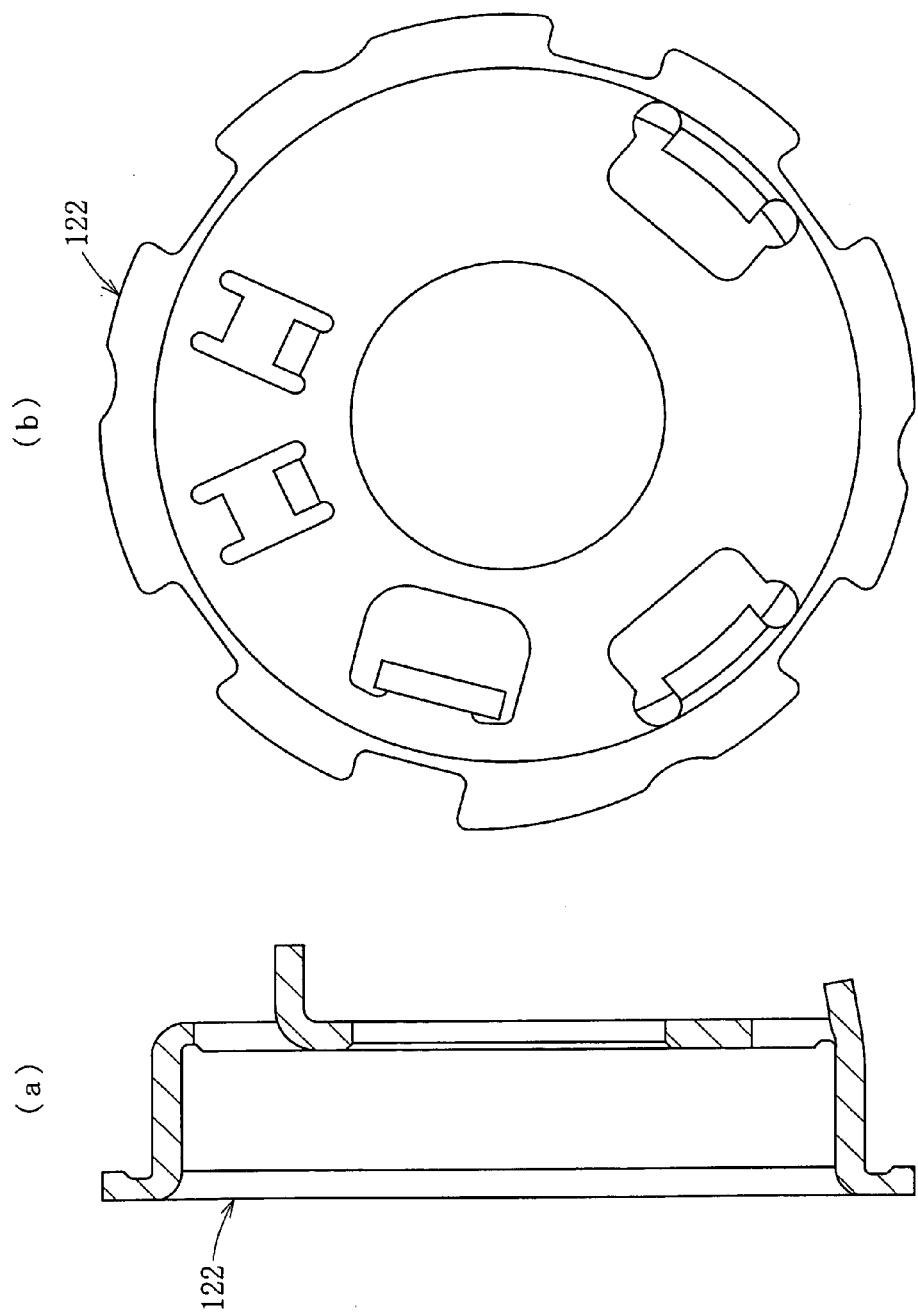
FIG. 12(a) is a sectional view of a conventional brake side outer ring.
FIG. 12(b) is a side view of FIG. 12(a).

Next, FIGS. 10(a) and 10(b) and FIGS. 11(a) through 11(c) show the plate-like member 22a and the cover 22b forming the brake side outer ring 22 of the present invention, and FIGS. 12(a) through 12(c) show the conventional brake side outer ring 122. The brake side outer ring 22 of the present invention includes two members of a thick plate-like member 22a formed by punching of a single material and a cover 22b formed by press working of a single separate material, with the plate-like member 22a and the cover 22b being integrally fixed to each other by swaging by means of a brake-side side plate 23 shown in FIGS. 13(a) and 13(b). In contrast, the conventional brake side outer ring 122 is formed into a cup-shaped configuration by press working of a single plate-like material.

Figure 13:
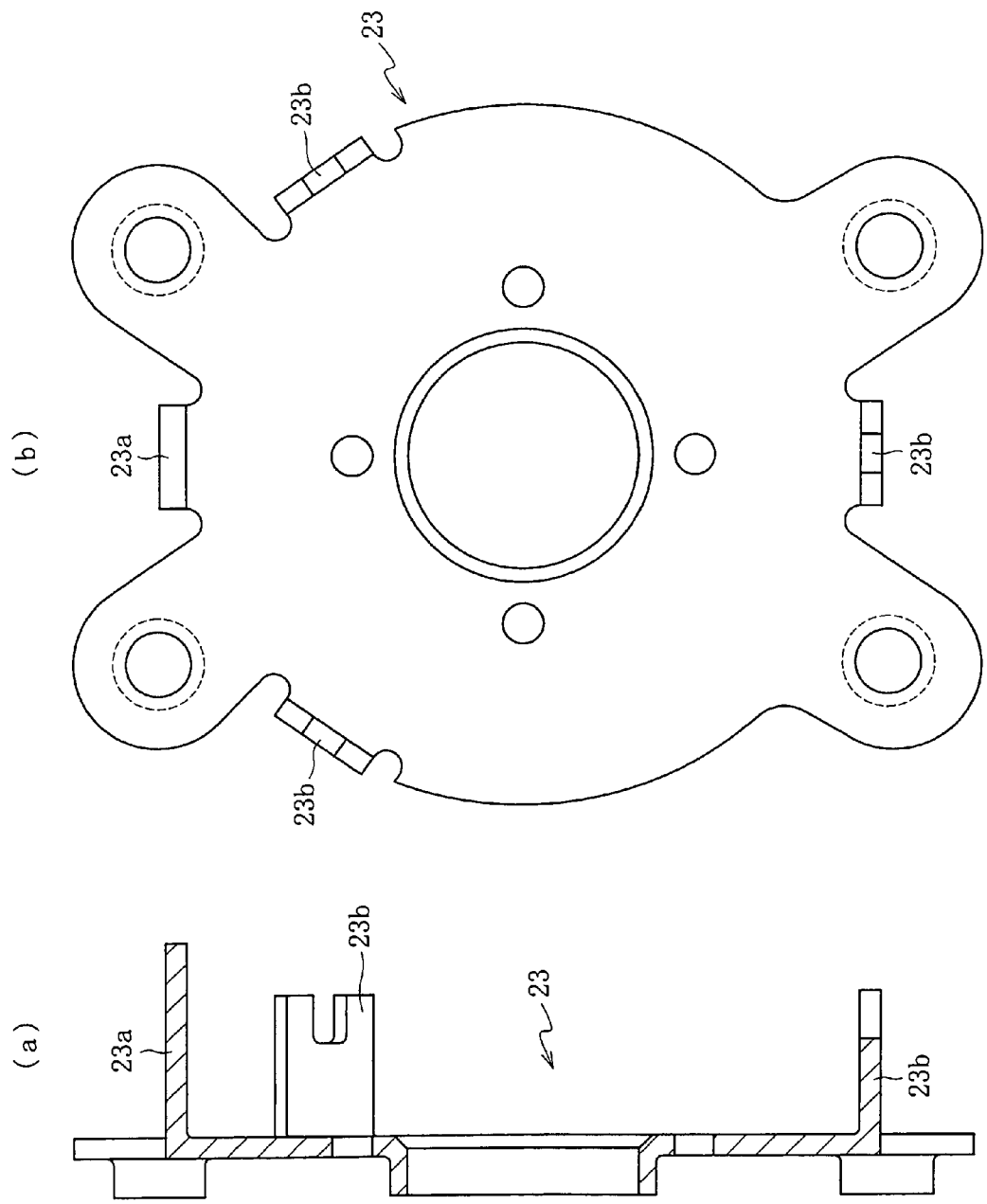
FIG. 13(a) is a sectional view of a brake-side side plate according to the present invention.
FIG. 13(b) is a side view of FIG. 13(a).
Figure 14:
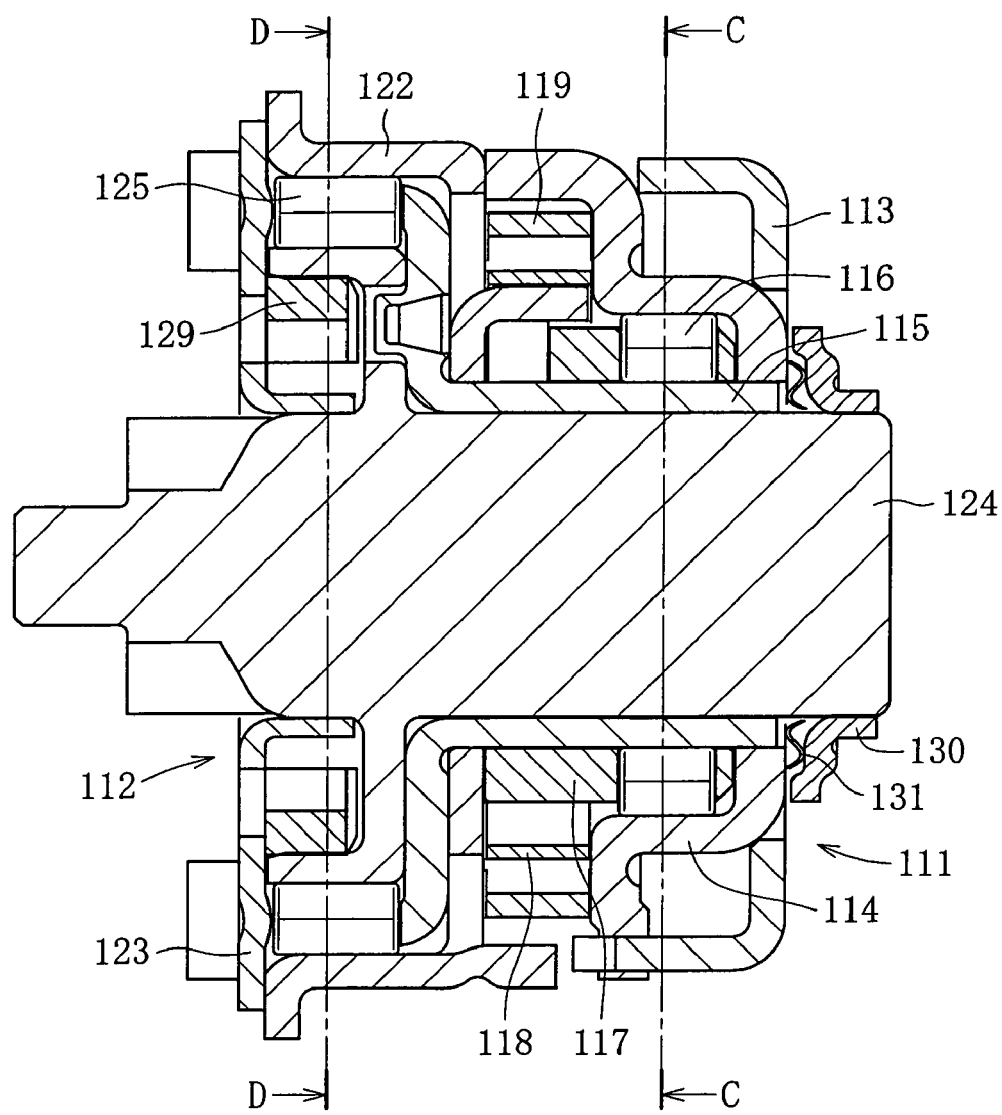
FIG. 14 is a sectional view showing the general construction of a conventional clutch unit.
Figure 15:
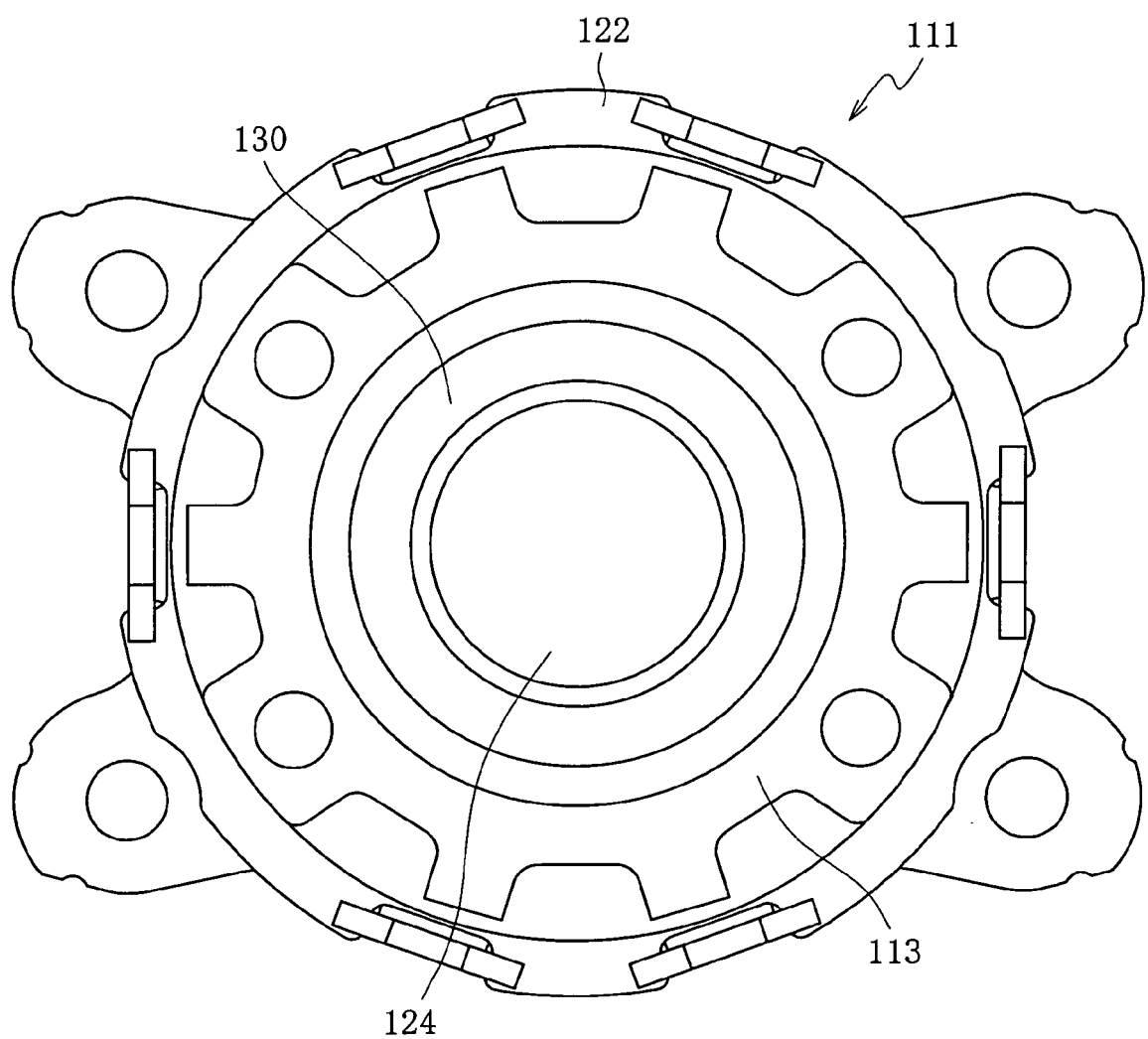
FIG. 15 is a right-hand side view of FIG. 14.
Figure 16:
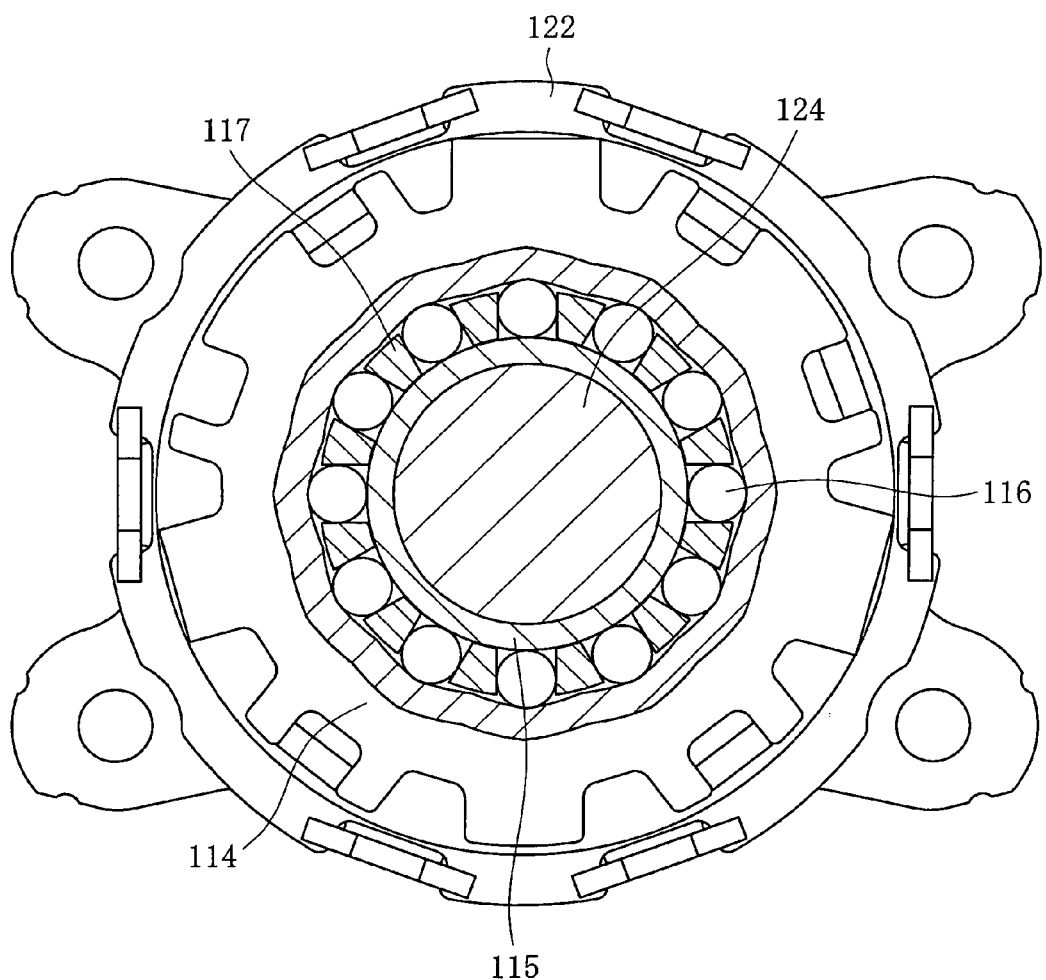
FIG. 16 is a sectional view taken along the line C-C of FIG. 14.
Figure 17:
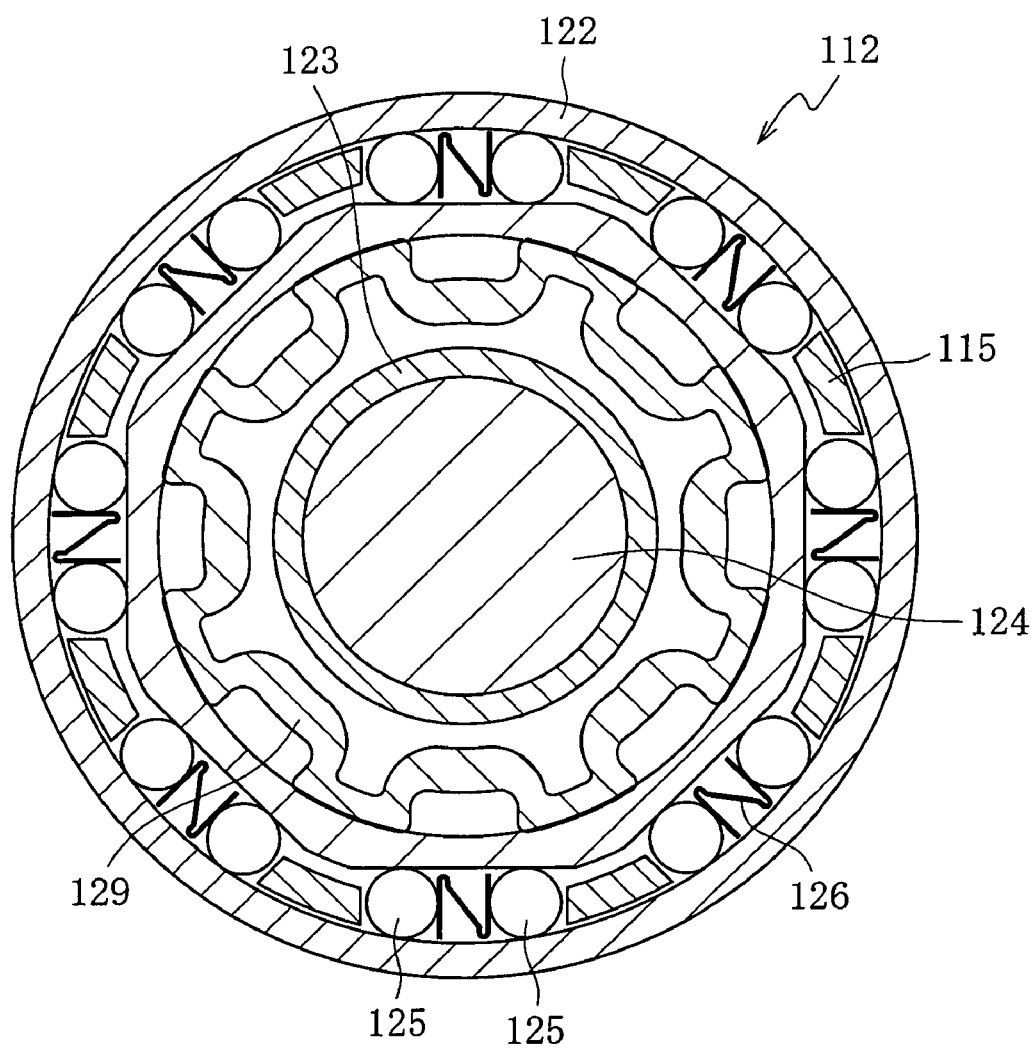
FIG. 17 is a sectional view taken along the line D-D of FIG. 14.

In the outer periphery of the plate-like member 22a forming the brake side outer ring 22 of the present invention, there are formed a plurality of (three) cutouts $22a_2$, and, also in the outer periphery of the cover 22b, there are formed a plurality of (three) cutouts $22b_2$, with the claw portions 23b of the brake-side side plate 23 (see FIGS. 13(a) and 13(b)) being inserted into the cutouts $22a_2$, $22b_2$. By swaging the claw portions 23b of the brake-side side plate 23 inserted into the cutouts $22a_2$, $22b_2$, the plate-like member 22a and the cover 22b are coupled together, and are integrated with the brake-side side plate 23 as the brake side outer ring 22.

A claw portion 23a of the brake-side side plate 23 arranged between lock portions 19a of the outer centering spring 19 is inserted into a cutout $22a_3$ formed in the outer periphery of the plate-like member 22a and into a cutout $22b_3$ formed in the outer periphery of the cover 22b. Further, in the inner periphery of the cover 22b, there is formed an axially protruding claw portion $22b_1$, which is arranged between lock portions 18a of the inner centering spring 18.

Numeral $22b_4$ in FIGS. 11(a) and 11(b) indicates stopper claws provided in the outer periphery of the cover 22b at opposing positions at an angle of 180 degrees with respect to each other, and predetermined circumferential gaps are provided between the stopper claws $22b_4$ and the claw portions $13a_2$ of the lever-side side plate 13. Through rotation of the lever-side side plate 13, the rotation of the lever side outer ring 14 is regulated, whereby the lever operation angle is regulated.

As described above, while the conventional product uses a cup-shaped brake side outer ring 122 formed by press working, the brake side outer ring 22 of the present invention is formed by two members of the plate-like member 22a formed by punching and the cover 22b. Accordingly, the plate-like member 22a can be formed relatively thick (approximately three times as thick as the conventional product), the strength of the brake side outer ring 22 is enhanced, and the elastic deformation amount is reduced, thereby easily achieving an improvement in terms of breaking torque.

In order to enhance the strength of the roller engagement surface, the conventional brake side outer ring 122 is subjected to heat treatment (carburizing and quenching/tempering). In the present invention, solely the plate-like member 22a, of which high strength is required, is subjected to heat treatment, and the cover 22b, of which relatively little strength is required, need not be subjected to heat treatment, thereby achieving a reduction in cost. Of course, when high strength is required, the cover is also subjected to heat treatment.

In the above-mentioned lever side clutch section 11, when input torque acts on the lever side outer ring 14, the cylindrical rollers 16 are engaged with the wedge gap 21, and the torque is transmitted to the inner ring 15 via the cylindrical rollers 16, causing the inner ring 15 to rotate. At this time, as the lever side outer ring 14 and the retainer 17 rotate, elastic force is accumulated in the centering springs 18 and 19. When the input torque ceases to exist, the lever side outer ring 14 and the retainer 17 are restored to the neutral state by the elastic force of the centering springs 18 and 19, whereas the inner ring 15 maintains the given rotating position. Thus, through repeated rotation of the lever side outer ring 14, that is, through pumping operation of the lever, the rotation amount of the inner ring 15 is increasingly accumulated.

In the brake side clutch section 12, when reverse input torque is input to the output shaft 24, the cylindrical rollers 25 are engaged with the wedge gap 28, and the output shaft 24 is locked with respect to the brake side outer ring 22. Thus, the reverse input torque from the output shaft 24 is locked by the brake side clutch section 12, and reflux of the reverse input torque to the lever side clutch section 11 is shut off.

On the other hand, the input torque from the lever side outer ring 14 is input to the inner ring 15 via the lever side clutch section 11, and the inner ring 15 is engaged with the cylindrical rollers 25 to press the same against the elastic force of the plate spring 26, whereby the cylindrical rollers 25 are detached from the wedge gap 28 to release the locked state of the output shaft 24, and the output shaft 24 becomes rotatable. When the inner ring 15 further rotates, the gap between the inner ring 15 and the protrusions 24c of the output shaft 24 is reduced, and the inner ring 15 is engaged with the protrusions 24c of the output shaft 24, whereby the input torque from the inner ring 15 is transmitted via the protrusions 24c, and the output shaft 24 rotates.

The invention claimed is:

1. A clutch unit comprising:
    a lever side clutch section provided on an input side, for controlling transmission/interruption of rotational torque to an output side through lever operation; and
    a brake side clutch section provided on the output side, for transmitting input torque from the lever side clutch section to the output side and interrupting reverse input torque from the output side,
    wherein the lever side clutch section includes a lever side outer ring to which the input torque is input,
    wherein the brake side clutch section comprises:
        a coupling member to which the input torque from the lever side clutch section is input;
        an output side member from which the input torque is output;
        a stationary side member constrained in its rotation; and
        a plurality of pairs of engagement members arranged in a gap between the stationary side member and the output side member, for controlling transmission of the input torque from the coupling member and interrupting the reverse input torque from the output side member through engagement/disengagement between the coupling member and the output side member, and
    wherein the stationary side member of the brake side clutch section forms an outer ring and comprises a plate member formed by punching and a cover formed by press working, the plate member and the cover being integrally fixed together by swaging by means of a side plate.

2. A clutch unit comprising:
    a lever side clutch section provided on an input side, for controlling transmission/interruption of rotational torque to an output side through lever operation; and
    a brake side clutch section provided on the output side, for transmitting input torque from the lever side clutch section to the output side and interrupting reverse input torque from the output side,
    wherein the lever side clutch section comprises:
        an input side member including a lever side outer ring to which the input torque is input through lever operation;
        a coupling member for transmitting the input torque from the input side member to the brake side clutch section;
        a plurality of engagement members for controlling transmission/interruption of the input torque from the input side member through engagement/disengagement between the input side member and the coupling member;
        a retainer for retaining the engagement members at predetermined intervals in a circumferential direction;
        a stationary side member constrained in its rotation;
        a first elastic member provided between the retainer and the stationary side member, for accumulating elastic force with the input torque from the input side member and restoring the retainer to a neutral state by an accumulated elastic force through releasing of the input torque;
        a second elastic member provided between the input side member and the stationary side member, for accumulating elastic force with the input torque from the input side member and restoring the input side member to a neutral state by an accumulated elastic force through releasing of the input torque; and
        a detachment prevention member press-fitted into the coupling member, and
    wherein the input side member of the lever side clutch section is a plate member formed by punching.

3. A clutch unit comprising:
    a lever side clutch section provided on an input side, for controlling transmission/interruption of rotational torque to an output side through lever operation; and
    a brake side clutch section provided on the output side, for transmitting input torque from the lever side clutch section to the output side and interrupting reverse input torque from the output side,
    wherein the brake side clutch section comprises:
        a coupling member to which the input torque from the lever side clutch section is input;
        an output side member from which the input torque is output;
        a stationary side member constrained in its rotation; and
        a plurality of pairs of engagement members arranged in a gap between the stationary side member and the output side member, for controlling transmission of the input torque from the coupling member and interrupting the reverse input torque from the output side member through engagement/disengagement between the coupling member and the output side member,
    wherein the lever side clutch section comprises:
        an input side member including a lever side outer ring to which the input torque is input through lever operation;
        the coupling member for transmitting the input torque from the input side member to the brake side clutch section;
        a plurality of engagement members for controlling transmission/interruption of the input torque from the input side member through engagement/disengagement between the input side member and the coupling member;
        a retainer for retaining the engagement members at predetermined intervals in a circumferential direction;

the stationary side member constrained in its rotation;

a first elastic member provided between the retainer and the stationary side member, for accumulating elastic force with the input torque from the input side member and restoring the retainer to a neutral state by an accumulated elastic force through releasing of the input torque;

a second elastic member provided between the input side member and the stationary side member, for accumulating the elastic force with the input torque from the input side member and restoring the input side member to a neutral state by an accumulated elastic force through releasing of the input torque; and a detachment prevention member press-fitted into the coupling member, and wherein the stationary side member of the brake side clutch section forms an outer ring and comprises a plate member formed by punching and a cover formed by press working, the plate member and the cover being integrally fixed together by swaging by means of a side plate, and wherein the input side member of the lever side clutch section is a plate member formed by punching.

4. The clutch unit according to claim 1, wherein the lever side outer ring has a constant thickness.

5. The clutch unit according to claim 2, wherein the lever side outer ring has a constant thickness.

6. The clutch unit according to claim 3, wherein the lever side outer ring has a constant thickness.

7. The clutch unit according to claim 1, wherein an inner surface of the lever side outer ring has a plurality of cam surfaces formed at equal circumferential intervals.

8. The clutch unit according to claim 2, wherein an inner surface of the lever side outer ring has a plurality of cam surfaces formed at equal circumferential intervals.

9. The clutch unit according to claim 3, wherein an inner surface of the lever side outer ring has a plurality of cam surfaces formed at equal circumferential intervals.

* * * * *